(12) United States Patent
Herz

(10) Patent No.: US 7,466,340 B1
(45) Date of Patent: Dec. 16, 2008

(54) METHOD AND APPARATUS FOR PROTECTION AGAINST PIXEL BURN-IN

(76) Inventor: William Herz, 25439 Old Fairview Ave., Hayward, CA (US) 94542

( * ) Notice: Subject to any disclaimer, the term of this patent is extended or adjusted under 35 U.S.C. 154(b) by 610 days.

(21) Appl. No.: 11/054,913

(22) Filed: Feb. 9, 2005

(51) Int. Cl.
*H04N 3/20* (2006.01)
(52) U.S. Cl. ...................................... 348/173
(58) Field of Classification Search ................. 348/173, 348/625, 626, 558, 563, 379, 678, 673; 315/169.3, 315/169.4, 380; 345/76, 77, 63
See application file for complete search history.

(56) References Cited

U.S. PATENT DOCUMENTS

| | | | | |
|---|---|---|---|---|
| 5,184,225 A | * | 2/1993 | Heidebroek et al. | 348/173 |
| 5,920,339 A | * | 7/1999 | Lee | 348/173 |
| 6,020,693 A | * | 2/2000 | Makida | 315/380 |
| 6,211,908 B1 | * | 4/2001 | Griepentrog | 348/173 |
| 6,313,878 B1 | * | 11/2001 | Jankowiak | 348/377 |
| 6,879,112 B2 | * | 4/2005 | Kubota et al. | 315/169.3 |
| 6,900,830 B2 | * | 5/2005 | Okabe | 348/173 |
| 7,113,153 B2 | * | 9/2006 | Kubota et al. | 345/60 |
| 7,245,316 B2 | * | 7/2007 | Grimes et al. | 348/173 |
| 7,271,828 B2 | * | 9/2007 | Okano | 348/173 |
| 2001/0030513 A1 | * | 10/2001 | Takada et al. | 315/169.4 |
| 2001/0035874 A1 | * | 11/2001 | Hamilton et al. | 345/682 |
| 2004/0165064 A1 | * | 8/2004 | Weitbruch et al. | 348/173 |

* cited by examiner

*Primary Examiner*—Paulos M Natnael
(74) *Attorney, Agent, or Firm*—Berkeley Law & Technology Group, LLP

(57) ABSTRACT

Embodiments for protecting against pixel burn-in are disclosed.

25 Claims, 6 Drawing Sheets

METHOD AND APPARATUS FOR PROTECTION AGAINST PIXEL BURN-IN

FIELD

This application pertains to the field of display devices, and more particularly, to the field of protecting against pixel burn-in.

BACKGROUND

Among the various devices for displaying video and graphics images are plasma display devices, cathode ray tube (CRT) devices, and liquid crystal display (LCD) devices. These display devices may receive digital display data from data display processing devices which may include digital video disc (DVD) players and recorders, digital tape players and recorders, satellite signal receivers, computers, digital cable television receivers, high definition television receivers, etc.

Some of the aforementioned display devices, for example plasma displays and CRT displays, include phosphor elements that may age over time as the phosphor elements are excited. A current trend among media providers, including television broadcasters, is to place static image elements within video streams. For example, during sporting events it is common for information such as team names and scores to be displayed at the upper or lower border of the image. Another example is television network logos that are commonly placed in a corner of an image. These elements remain relatively static compared to the rest of the image which is generally in motion.

Another trend is for black or grey bars to be placed either at the top and bottom edges of the display or at each side of an image. For example, when viewing a letterboxed movie on a television with a standard 4:3 aspect ratio, black bars appear at the top and bottom of the screen. Similarly, when view 4:3 content on a 16:9 widescreen display, black or grey bars appear at each side of the screen.

In the case of static display elements, a problem may occur where the pixel elements that are included within the region of the static display elements are excited to a greater degree over time the rest of the pixels of a display device. This may result in the static display region pixels aging quicker than the rest of the display pixels. In the case of the black bar regions, the display area outside of the black bar regions may age quicker than the black bar regions. This process may be referred to as pixel "burn-in." The burn-in process may occur slowly over time or more quickly depending on the intensity of the relevant pixel values.

Over time, the effects of the varying degeneration rates of the various pixel elements may become visible, with parts of a display brighter, more vibrant, and with more accurate color representation than other parts of the display. It would be desirable to provide a solution that would help display devices to age more uniformly and to help guard against excessive burn-in.

BRIEF DESCRIPTION OF THE DRAWINGS

The claimed subject matter will be understood more fully from the detailed description given below and from the accompanying drawings of embodiments which should not be taken to limit the claimed subject matter to the specific embodiments described, but are for explanation and understanding only.

FIG. 4 is an example embodiment of a method for protection against pixel burn-in.

FIG. 5 is an example embodiment of a method for protection against pixel burn-in.

DETAILED DESCRIPTION

Figure 1:
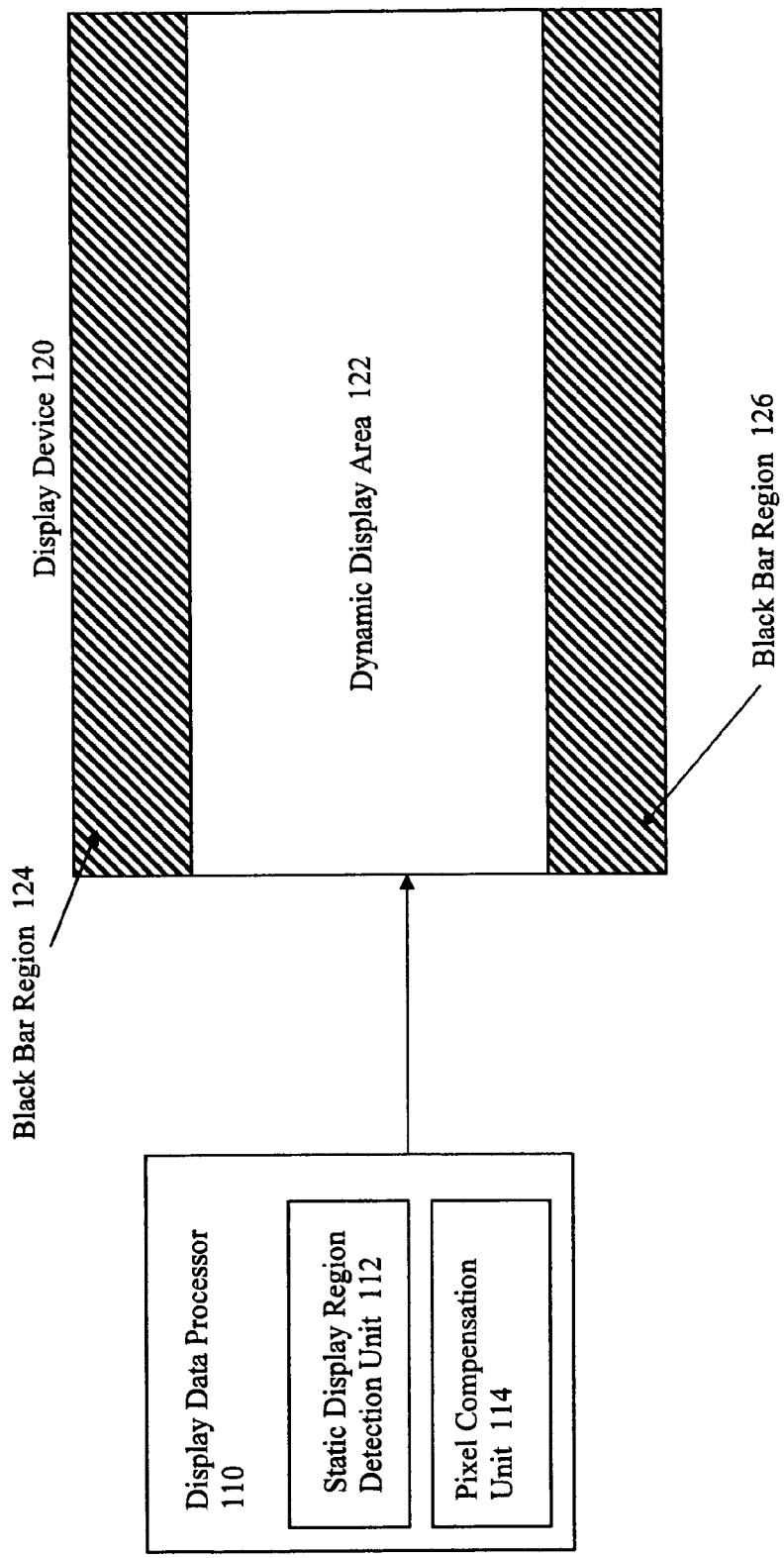
FIG. 1 is a block diagram of one embodiment of an example system including a display data processor coupled to a display device.

FIG. 1 is a block diagram of one embodiment of an example system including a display data processor 110 coupled to a display device 120. As used herein, the term "display data processor" is meant to denote any device that may produce video or graphics images for display on a display device. Examples of display data processors include DVD players, computers, satellite television receivers, digital tape players, digital cable television receivers, games consoles, etc. Some display data processors may include processors capable of processing display information. For example, some display processors may include the ability to decoder compressed motion video streams or manipulate display data in other ways. Display data processors may include graphics processing units (CPU) to perform these and other functions.

For this example embodiment, display data processor 110 is coupled to the display device 120. As used herein, the term "display device" is meant to include a wide range of devices capable of displaying video or graphics images, including, but not limited to, plasma displays, LCD displays, and CRT displays.

For this example, display device 120 is shown with a dynamic display area 122 and with black bar regions 124 and 126. This example depicts a situation where an anamorphic image, perhaps a move from a DVD, is shown on a 16:9 widescreen display. Black bar regions 124 and 126 are placed at the top and bottom of the screen to fill out the display area.

The example of black bar regions filling out a display area when placing anamorphic images on a 16:9 display is only one of the many various situations where black bar regions are used to fill out a display area. Other example include, but are not limited to, viewing 4:3 aspect ratio images on widescreen display devices, which results in black bar regions being seen at each edge of the display area, and viewing letterboxed images on 4:3 aspect ratio display devices. Another example situation that may result in black bar regions around borders of a display is a personal computer desktop that is displayed on a display device such as a plasma display device. In this situation, overscan correction may result in black borders surrounding the displayed computer desktop.

The term "black bar region" as used herein in meant to include regions that are relatively static and are relatively dark in color. The term is not meant to signify only regions that are completely black. The term "black bar region" may include areas that are varying shades of grey. Further, the black bar regions may not be completely uniform in color, as noise elements and compression artifacts may produce dark regions that are not completely uniform. Further, black bar regions may be of any shape. Black bar regions for some embodiments may not include any video content.

For this example embodiment, display data processor 110 includes a static display region detection unit 112 and a pixel compensation unit 114. The functions of these units may be performed in hardware by dedicated circuitry or by software agents executed by a CPU or other processor, or by a combination of software and hardware. Static display region detection unit 112 may examine display data before it is delivered to display device 120 to determine whether any static display regions are present in the display data stream. This function may take place in concert with decoding process associated with compressed video image streams. Static display region detection unit 112 may look for black bar regions, paying attention to pixel color values over time, or may look for static image elements, paying attention to movement over time. Another embodiment may include a function allowing a user to identify black bar regions or static display elements by drawing a box or other shapes around the desired region with a cursor.

Pixel compensation unit 114 may include functions to modulate pixel values within designated black bar or static element regions. Pixel values may be modulated in a manner that helps to ensure more uniform pixel burn-in. For example, for black bar regions, the various pixel values may be increased so that the average intensity of the pixels within the black bar regions more closely matches the average intensity of the pixels with the dynamic display area.

Figure 2:
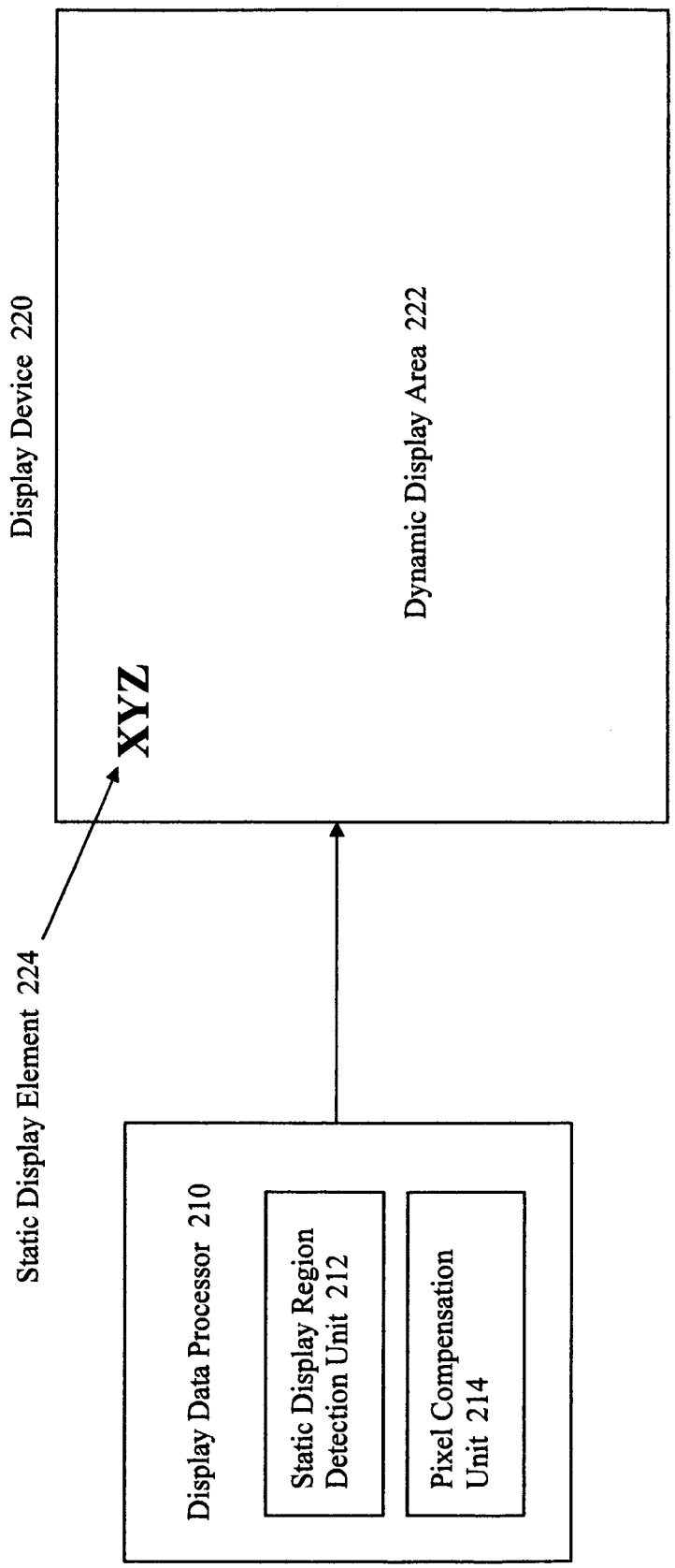
FIG. 2 is a block diagram of one embodiment of an example system including a display data processor coupled to a display device.

FIG. 2 is a block diagram of one embodiment of an example system including a display data processor 210 coupled to a display device 220. Display data processor 210 includes a static display region detection unit 212 and a pixel compensation unit 214. The functions of these units may be performed in hardware by dedicated circuitry or by software agents executed by a GPU or other processor, or by a combination of software and hardware. For this example, display device 220 is displaying images that produce a static display element 224 superimposed on a dynamic display area 222.

For this example, static display region detection unit 212 detects the static display element 224. Pixel compensation unit 214 may reduce the intensity of the pixel values of the pixels within static display element 224 so that the average intensity of the pixels that make up the static display element more closely matches the average intensity of the pixels of dynamic display area 222.

For one embodiment, the detection of the static display element 224 may include using edge detection techniques to identify letters. Other embodiments may detect light blocks that may surround letters.

Figure 3:
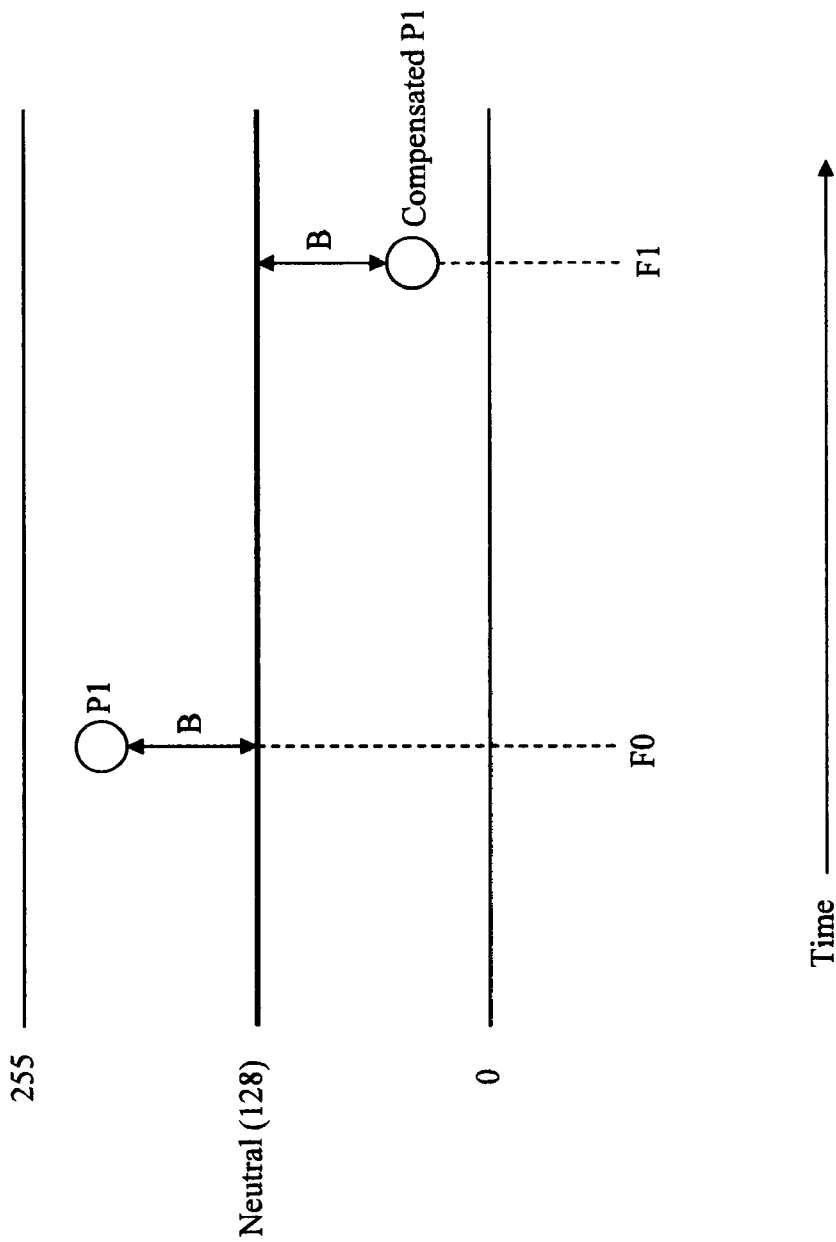
FIG. 3 is a timeline depicting an example embodiment of a compensation process of a pixel element.

FIG. 3 is a timeline depicting an example embodiment of a compensation process of a pixel element. A mathematical expression of this example may be as follows:

$$Pn(t)=Po(t)+B(t)$$

where $Pn$=New Pixel Value $Po$=Old Pixel Value $t$=time $B$=Burn-in factor (may be a positive or negative value)

At time F0 (designating frame 0), a pixel P1 has a particular value. For this example that value is B more than a neutral pixel value, which for this example is 128. For this example, which uses an 8 bit system, the maximum possible pixel value is 255 and the minimum possible value is 0. Of course, many other embodiments are possible using other pixel value minimums and maximums and neutral values. The digital values may be proportional to brightness, pixel illumination, and pixel energy. At time F1 (designating frame 1), the pixel value for P1 is reduced by the burn-in factor B, resulting in a compensated pixel value. Thus, although the original pixel value for pixel P1 was at a value that may result in pixel burn-in either in the short term or over a longer term, because the pixel value for P1 was reduced at time F1, the resulting average pixel value is neutral.

The example of FIG. 3 is only one of many possible techniques for providing pixel compensation.

Although the example of FIG. 3 shows a reduction in pixel value to provide compensation, other situations may call for an increase in pixel values, for example in the case of black bar regions.

The example techniques described herein may be applied to all pixels within a designated region or to select pixels. The selection of pixels for compensation may be randomized or some other selection algorithm may be used within a designated region in order to avoid visual artifacts. If all pixels in a region are compensated within a single frame time, visual artifacts may result.

Some embodiments may employ several pixel values per pixel, for example for red, green, and blue pixel elements. Each of these color elements may have their pixel values increased or decreased by an amount proportional to the other elements, or other algorithms may be used.

Figure 4:
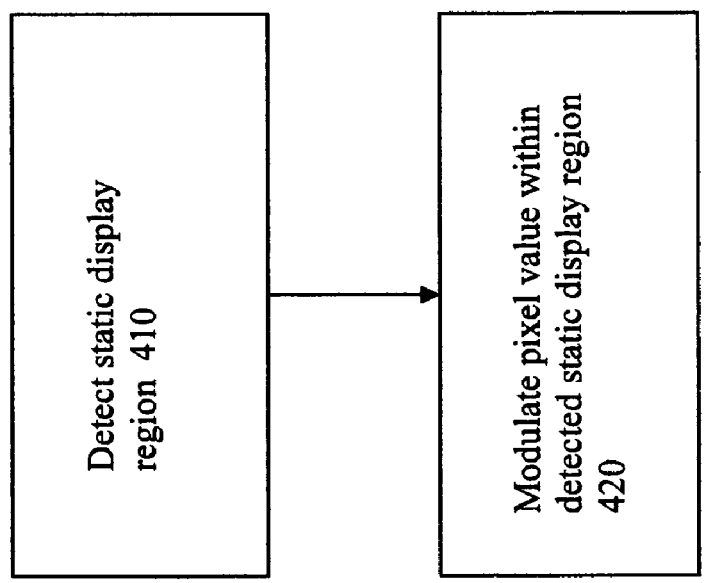

FIG. 4 is an example embodiment of a method for protection against pixel burn-in. At block 410, a state display region is detected. The techniques used to detect a static display region may include, but is not limited to, any of the techniques discussed herein. Other embodiments may use other techniques for detecting a static display region.

At block 420, a pixel value for a pixel within a detected static display region is modulated. The technique used to modulate the pixel value may include, but is not limited to, any of the techniques discussed herein. Other embodiments may use other techniques to modulate pixel values.

Figure 5:
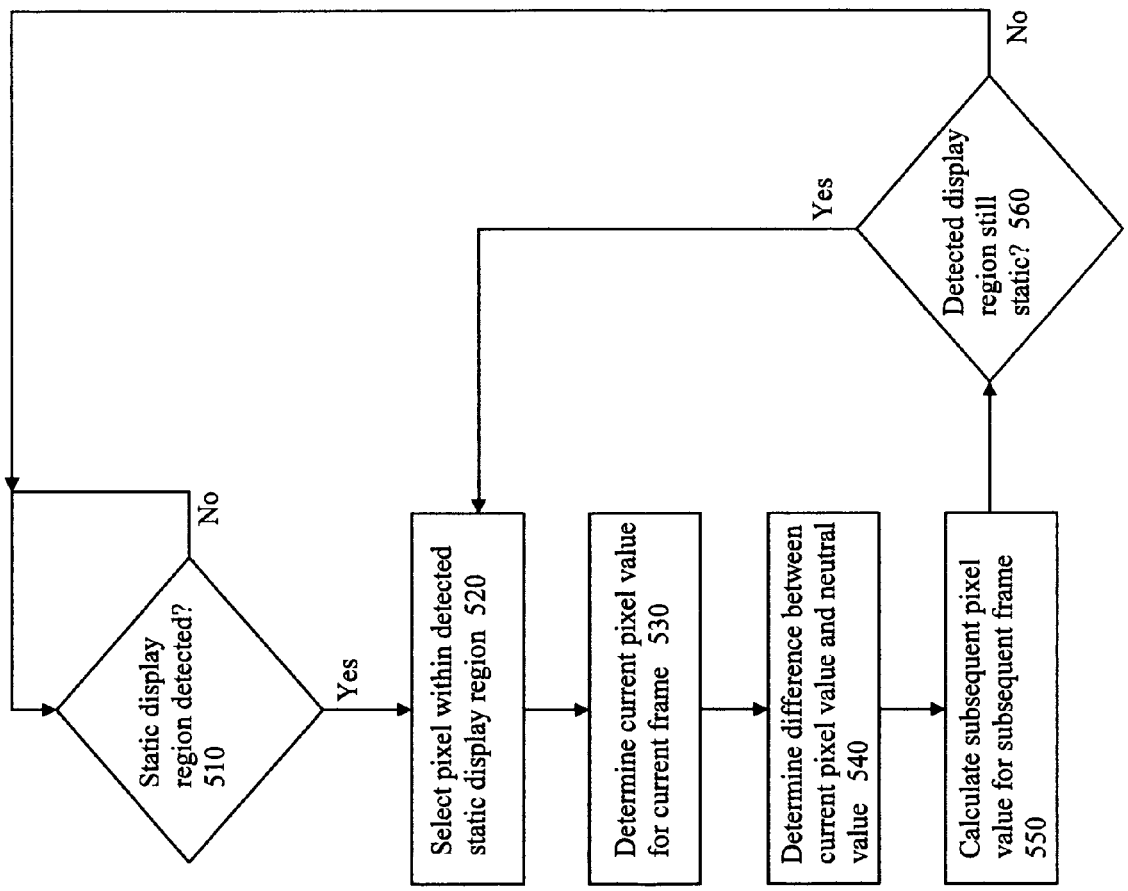

FIG. 5 is an example embodiment of a method for protection against pixel burn-in. At block 510, a determination is made as to whether a static display region has been detected. If so, then at block 520 a pixel is selected from within the detected static display region. A current pixel value for the selected pixel is determined at block 530. At block 540, a difference between the current pixel value and a neutral value is determined. At block 550, the difference is used to calculate a subsequent pixel value for the selected pixel for a subsequent frame. A determination is made at block 560 as to whether the detected static display region is still static. If so, then processing returns to block 520 where another pixel is selected. If not, then processing returns to block 510.

Although this example embodiment describes providing burn-in compensation for a single pixel at a time, other embodiments may provide compensation for a number of pixels within a detected static region for each frame of display data. For example, for one frame time, a first subset of pixels from a detected static display region may receive burn-in compensation, then for a subsequent frame, a different subset of pixels from the detected static display region may receive compensation. The first and subsequent subsets of pixels may or may not have at least some pixels in common.

For one example, a static display region may have the dimensions of 100 pixels by 75 pixels. Of the 7,500 pixels in the region, perhaps 100 may be operated on during a given frame time. Over the course of 75 frame times, all of the pixels in the region will have been operated on in order to provide burn-in compensation. For some embodiments, the order in which the pixels are operated on may be randomized in order to minimize visual perception of any aberrations due to the compensation process.

Figure 6:
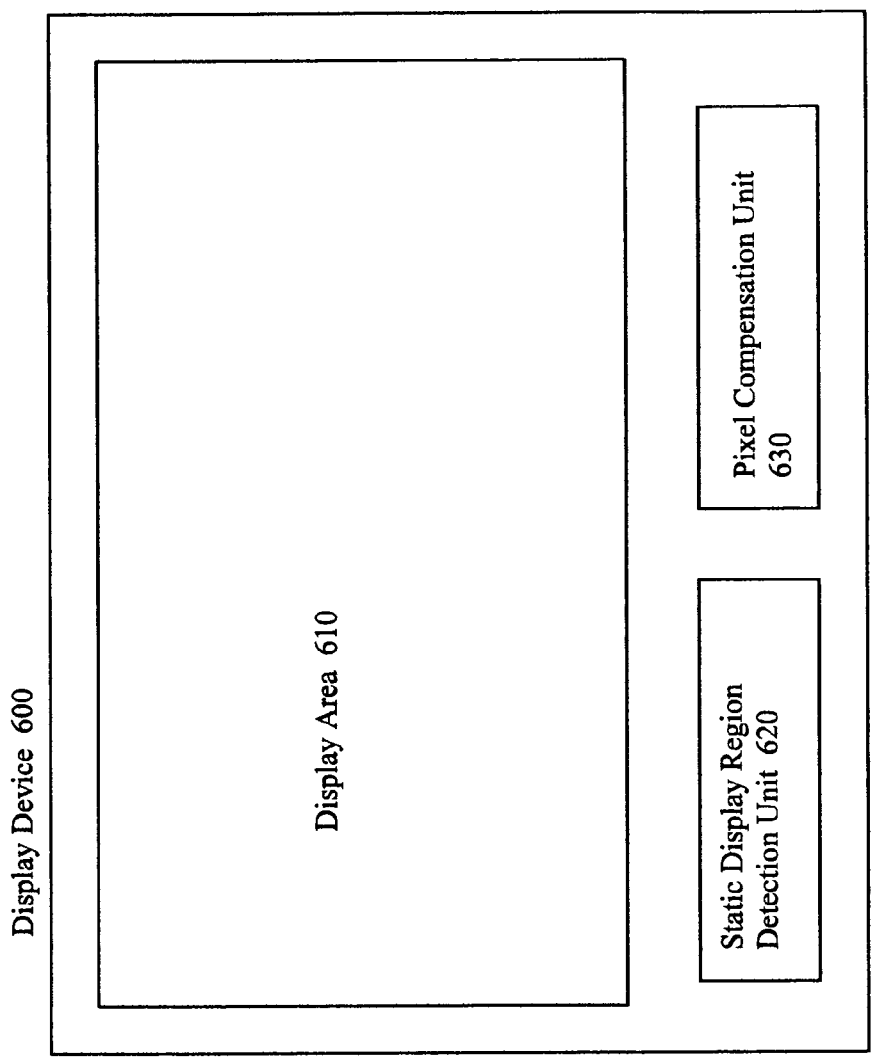
FIG. 6 is a block diagram of an example embodiment of a display device.

FIG. 6 is a block diagram of an example embodiment of a display device 600. For this example embodiment, display device 600 includes a static display region detection unit 620 and a pixel compensation unit 630. These units may function similar to the corresponding units discussed above in connection with FIGS. 1 and 2. For this example, instead of the various burn-in compensation functions being located in a display data processor, the burn-in compensation functions are included in a display device. In this manner, display device manufacturers may elect to provide burn-in protection without needing to rely on these features being included in display data processors.

In other embodiments, burn-in compensation functions may be split between display data processors and display devices.

The various parameters described herein, including burn-in factor B, the amount of time to provide compensation for a detected region, the amount of time to provide compensation for individual pixels within detected static regions, the techniques used to detect and/or select static display regions, and the techniques used to provide burn-in compensation may be made fully programmable. For example, the value of the burn-in value B may be programmable and can either be fixed or dithered. Dithering may occur across a region of pixels or across time for individual pixels. The definition of a neutral pixel value may also be programmable. The various parameters discussed can be adjusted according to desired level of burn-in protection and acceptable amounts of visible display artifacts.

In some embodiments, pixel compensation may be implemented using a GPU with a programmable video processor or pixel shaders. This may allow pixel compensation concurrent with other pixel operations, such as deinterlacing, etc.

In one embodiment, a menu may be provided to a user of a display data processor a display device that can enable the user to designate a desired level of burn-in protection weighed against the acceptability of potential visual artifacts.

Reference in the specification to "an embodiment," "one embodiment," "some embodiments," or "other embodiments" means that a particular feature, structure, or characteristics described in connection with the embodiments is included in at least some embodiments, but not necessarily all embodiments. The various appearances of "an embodiment," "one embodiment," or "some embodiments" are not necessarily all referring to the same embodiments.

In the foregoing specification the claimed subject matter has been described with reference to specific example embodiments thereof. It will, however, be evident that various modifications and changes may be made thereto without departing from the broader spirit and scope of the subject matter as set forth in the appended claims. The specification and drawings are, accordingly, to be regarded in an illustrative rather than in a restrictive sense.

What is claimed is:

1. An apparatus, comprising:
    a static display region detection unit; and
    a pixel compensation unit to modulate one or more pixel values corresponding to a first subset of pixels within a detected static display region, wherein the first subset of pixels comprises at least one pixel fewer than the total number of pixels of the detected static display region.

2. The apparatus of claim 1, wherein the static display region detection unit is adapted to receive an input from a user identifying the static display region.

3. The apparatus of claim 2, wherein the input from the user comprises a user-defined static region identified by the user by drawing a box around the user-defined static region with a cursor.

4. The apparatus of claim 1, wherein the static display region detection unit comprises a black bar region detection unit.

5. The apparatus of claim 1, wherein the static display region detection unit comprises a static pattern detection unit.

6. The apparatus of claim 1, the pixel compensation unit to modulate the one or more pixel values corresponding to the first subset of pixels within the detected static display region by determining one or more current pixel values for the one or more pixels for a current frame and calculating a subsequent one or more pixel values for the one or more pixels for a subsequent frame.

7. The apparatus of claim 6, the pixel compensation unit to calculate the one or more subsequent pixel values by determining a difference between the one or more current pixel values and a neutral value and subtracting the respective difference from the one or more current pixel values.

8. A method, comprising:
    detecting a static display region; and
    modulating one or more pixel values corresponding to a first subset of pixels within the detected static display region, wherein the first subset of pixels comprises at least one pixel fewer than the total number of pixels of the detected static display region.

9. The method of claim 8, wherein said detecting the static display region comprises receiving an input from a user identifying the static display region.

10. The method of claim 9, wherein said receiving the input from the user comprises receiving an input from the user defining a user-defined static region identified by the user by drawing a box around the user-defined static region with a cursor.

11. The method of claim 8, wherein said detecting the static display region comprises a detecting a black bar region.

12. The method of claim 8, wherein said detecting the static display region comprises detecting a static pattern.

13. The method of claim 8, wherein said modulating the one or more pixel values corresponding to the first subset of pixels within the detected static display region comprises determining one or more current pixel values for the one or more pixels for a current frame and calculating one or more subsequent pixel values for the one or more pixels for a subsequent frame.

14. The method of claim 13, wherein said calculating the one or more subsequent pixel values comprises determining a difference between the one or more current pixel values and a neutral value and subtracting the respective difference from the one or more current pixel values.

15. The method of claim 8, further comprising subsequently modulating a second subset of pixel values of a corresponding second subset of pixels within the detected static display region, wherein the second subset of pixels comprises one or more pixels that are not included in the first subset of pixels.

16. The system of claim 9, wherein the static display region detection unit comprises a black bar region detection unit.

17. The system of claim 9, wherein the static display region detection unit comprises a static pattern detection unit.

18. An article, comprising: a machine-readable medium having stored thereon instructions that, if executed, direct a display data processor to:

detect a static display region; and modulate one or more pixel values corresponding to a first subset of pixels within the detected static display region, wherein the first subset of pixels comprises at least one pixel fewer than the total number of pixels in the detected static display region.

19. The article of claim 18, wherein the machine-readable medium has stored thereon further instructions that, if executed, direct the display data processor to detect the static display region by detecting a black bar region.

20. The system of claim 17, the pixel compensation unit to subsequently modulate one or more pixels values corresponding to a second subset of pixels within the detected static display region, wherein the second subset of pixels comprises one or more pixels that are not included in the first plurality of pixels.

21. The article of claim 18, wherein the machine-readable medium has stored thereon further instructions that, if executed, direct the display data processor to detect the static display region by detecting a static pattern.

22. The article of claim 18, wherein the machine-readable medium has stored thereon further instructions that, if executed, direct the display data processor to modulate the one or more pixel values corresponding to the first subset of pixels by determining one or more current pixel values for the first subset of pixels for a current frame and calculating one or more subsequent pixel values for the first subset of pixels for a subsequent frame, wherein said calculating the one or more subsequent pixel values comprises determining a difference between each of the one or more current pixel values and a neutral value and subtracting the respective difference from the one or more current pixel values.

23. The article of claim 18, wherein the machine-readable medium has stored thereon further instructions that, if executed, direct the display data processor to subsequently modulate a second subset of pixel values for a corresponding second subset of pixels within the detected static display region, wherein the second subset of pixels comprises one or more pixels that are not included in the first subset of pixels.

24. The system of claim 21, the pixel compensation unit to subsequently modulate one or more pixels values corresponding to a second subset of pixels within the detected static display region, wherein the second subset of pixels comprises one or more pixels that are not included in the first plurality of pixels.

25. The article of claim 21, wherein the machine-readable medium has stored thereon further instructions that, if executed, direct the display data processor to subsequently modulate a second subset of pixel values for a corresponding second subset of pixels within the detected static displayregion, wherein the second subset of pixels comprises one ormore pixels that are not included in the first subset of pixels.

* * * * *